(12) United States Patent
Kanehara et al.

(10) Patent No.: US 12,743,896 B2
(45) Date of Patent: Sep. 22, 2026

(54) LEARNING DEVICE, LEARNING METHOD, AND STORAGE MEDIUM

(71) Applicants: HONDA MOTOR CO., LTD., Minato-ku (JP); SENSETIME GROUP LIMITED, Shatin (CN)

(72) Inventors: Akira Kanehara, Wako (JP); Chenguang Li, Shanghai (CN); Jiazhao Zhang, Shanghai (CN)

(73) Assignees: HONDA MOTOR CO., LTD., Tokyo (JP); SENSETIME GROUP LIMITED, Shatin (CN)

( * ) Notice: Subject to any disclaimer, the term of this patent is extended or adjusted under 35 U.S.C. 154(b) by 0 days.

(21) Appl. No.: 18/811,849

(22) Filed: Aug. 22, 2024

(65) Prior Publication Data

US 2025/0078534 A1 Mar. 6, 2025

(30) Foreign Application Priority Data

Aug. 28, 2023 (CN) ......................... 202311094729.5

(51) Int. Cl.
*G06V 20/56* (2022.01)
*G06V 10/75* (2022.01)

(52) U.S. Cl.
CPC .......... *G06V 20/588* (2022.01); *G06V 10/751* (2022.01)

(58) Field of Classification Search
CPC .... G06V 20/588; G06V 10/751; G06V 10/82; G06V 10/454; G06N 3/0464; G06N 3/084
See application file for complete search history.

(56) References Cited

U.S. PATENT DOCUMENTS

2002/0163670 A1* 11/2002 Takahira .............. G06K 15/186 358/521
2007/0211307 A1* 9/2007 Uvarov ..................... G06T 5/20 358/463

(Continued)

FOREIGN PATENT DOCUMENTS

JP 2019-192009 10/2019
JP 2020-038101 3/2020
JP 2023-109620 8/2023

OTHER PUBLICATIONS

Japanese Notice of Allowance for Japanese Patent Application No. 2024-145943 mailed Feb. 3, 2026.

*Primary Examiner* — Gims S Philippe
(74) *Attorney, Agent, or Firm* — Amin, Turocy & Watson, LLP

(57) ABSTRACT

A learning device for training a machine learning model that receives an image as an input and outputs a first pixel region representing road edges and a second pixel region representing a road area in the image includes a storage medium storing computer-readable instructions and a processor connected to the storage medium, the processor executing the computer-readable instructions to compare the first and second pixel regions to determine a degree of matching between the first and second pixel regions, set a gain for a first error between the first pixel region and correct data representing the road edges and a second error between the second pixel region and correct data representing the road area based on the degree of matching, and train the machine learning model so as to reduce a value of a loss function calculated based on the first and second errors for which the gain has been set.

5 Claims, 4 Drawing Sheets

(56) References Cited

U.S. PATENT DOCUMENTS

| | | | | |
|---|---|---|---|---|
| 2017/0034434 | A1* | 2/2017 | Zhang | H04N 23/951 |
| 2018/0025235 | A1* | 1/2018 | Fridman | H04N 23/90<br>382/103 |
| 2018/0194286 | A1* | 7/2018 | Stein | B60W 10/04 |
| 2019/0332898 | A1 | 10/2019 | Saruta | |
| 2020/0097772 | A1* | 3/2020 | Nakanishi | G06N 3/0464 |
| 2022/0412772 | A1* | 12/2022 | Rabani | G06V 20/588 |
| 2024/0092366 | A1* | 3/2024 | Ogata | G06V 20/56 |

* cited by examiner

LEARNING DEVICE, LEARNING METHOD, AND STORAGE MEDIUM

CROSS-REFERENCE TO RELATED APPLICATION

Priority is claimed on Chinese Patent Application No. 202311094729.5, filed Aug. 28, 2023, the content of which is incorporated herein by reference.

BACKGROUND

Field of the Invention

The present invention relates to a learning device, a learning method, and a storage medium.

Description of Related Art

Technologies for detecting a road area included in an image for use in vehicle driving support or automatic driving are known in the related art. For example, Japanese Unexamined Patent Application, First Publication No. 2020-038101 discloses a technology in which an input image is scanned in an x direction to extract edges and white lines are detected based on the difference in color near the edges to detect a road area.

However, in the technology described in Japanese Unexamined Patent Application, First Publication No. 2020-038101, the accuracy of white lines detected by scanning is not verified from different viewpoints. As a result, with the technology of the related art, it may not be possible to ensure the accuracy of a road area detected from an image.

SUMMARY

The present invention has been made in view of such circumstances and it is an object of the present invention to provide a learning device, a learning method, and a storage medium that can ensure the accuracy of a road area detected from an image by verifying the road area from a plurality of viewpoints.

A learning device, a learning method, and a storage medium according to the present invention employ the following configurations.

1) A learning device according to an aspect of the present invention is a learning device configured to train a machine learning model that receives an image as an input and outputs a first pixel region representing road edges and a second pixel region representing a road area in the image, the learning device including a determining unit configured to compare the first pixel region and the second pixel region to determine a degree of matching between the first pixel region and the second pixel region, a setting unit configured to set a gain for a first error between the output first pixel region and correct data representing the road edges and a second error between the output second pixel region and correct data representing the road area based on the degree of matching, and a learning unit configured to train the machine learning model so as to reduce a value of a loss function calculated based on the first error and the second error for which the gain has been set.

(2) In the above aspect (1), the determining unit is configured to determine that the degree of matching is higher as a gap and overlap with which the second pixel region is sandwiched by the first pixel region become smaller.

(3) In the above aspect (1) or (2), the setting unit is configured to increase a value of the gain to be set as the determined degree of matching decreases.

(4) A learning method according to another aspect of the present invention is a learning method for training a machine learning model that receives an image as an input and outputs a first pixel region representing road edges and a second pixel region representing a road area in the image, the learning method including, by a computer, comparing the first pixel region and the second pixel region to determine whether the second pixel region is sandwiched by the first pixel region, setting a gain for a first error between the output first pixel region and correct data representing the road edges and a second error between the output second pixel region and correct data representing the road area based on the degree of matching, and training the machine learning model so as to reduce a value of a loss function calculated based on the first error and the second error for which the gain has been set.

(5) A computer-readable non-transitory storage medium according to another aspect of the present invention stores a program for training a machine learning model that receives an image as an input and outputs a first pixel region representing road edges and a second pixel region representing a road area in the image, the program causing a computer to compare the first pixel region and the second pixel region to determine whether the second pixel region is sandwiched by the first pixel region, set a gain for a first error between the output first pixel region and correct data representing the road edges and a second error between the output second pixel region and correct data representing the road area based on the degree of matching, and train the machine learning model so as to reduce a value of a loss function calculated based on the first error and the second error for which the gain has been set.

According to the above aspects (1) to (5), it is possible to ensure the accuracy of a road area detected from an image by verifying the road area from a plurality of viewpoints.

DESCRIPTION OF EMBODIMENTS

Hereinafter, embodiments of a learning device, a learning method, and a storage medium of the present invention will be described with reference to the drawings.

Configuration

Figure 1:
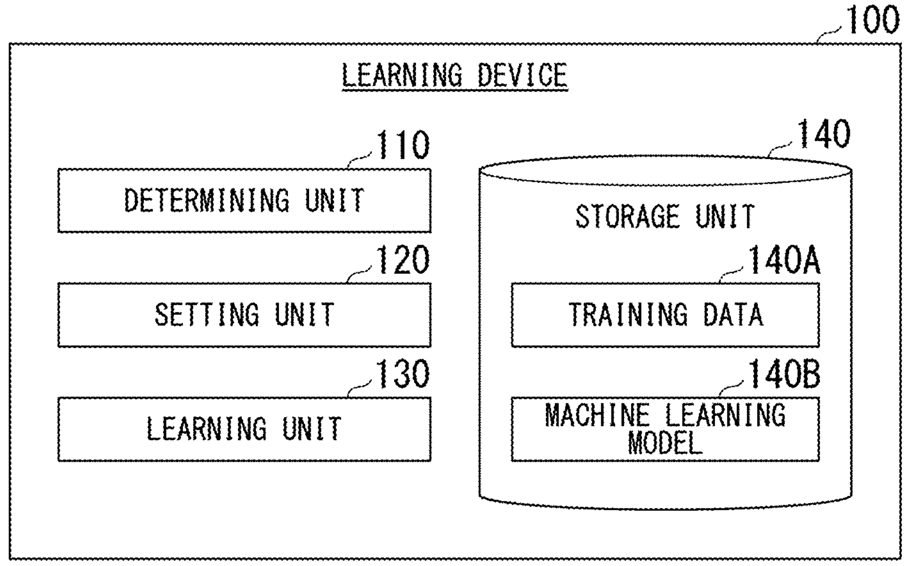
FIG. 1 is a diagram showing a configuration of a learning device according to the present embodiment.

FIG. 1 is a diagram showing a configuration of a learning device 100 according to the present embodiment. The learning device 100 is an information processing device that trains a machine learning model that receives an image as an input and outputs a first pixel region representing road edges and a second pixel region representing a road area in the image. The learning device 100 includes, for example, a determining unit 110, a setting unit 120, a learning unit 130, and a storage unit 140. The determining unit 110, the setting unit 120, and the learning unit 130 are each implemented, for example, by a hardware processor such as a central processing unit (CPU) executing a program (software). Some or all of these components may be implemented by hardware (including circuitry) such as a large scale integration (LSI), an application specific integrated circuit (ASIC), a field-programmable gate array (FPGA), or a graphics processing unit (GPU) or may be implemented by software and hardware in cooperation. The program may be stored in a storage device (a storage device including a non-transitory storage medium) such as an HDD of the learning device 100 or a flash memory in advance or may be stored in a detachable storage medium (a non-transitory storage medium) such as a DVD or a CD-ROM and then installed on the HDD of the learning device 100 or the flash memory by mounting the storage medium in a drive device. The storage unit 140 stores, for example, training data 140A and a machine learning model 140B. The storage unit 140 is implemented, for example, by a RAM, a flash memory, or an SD card.

Figure 2:
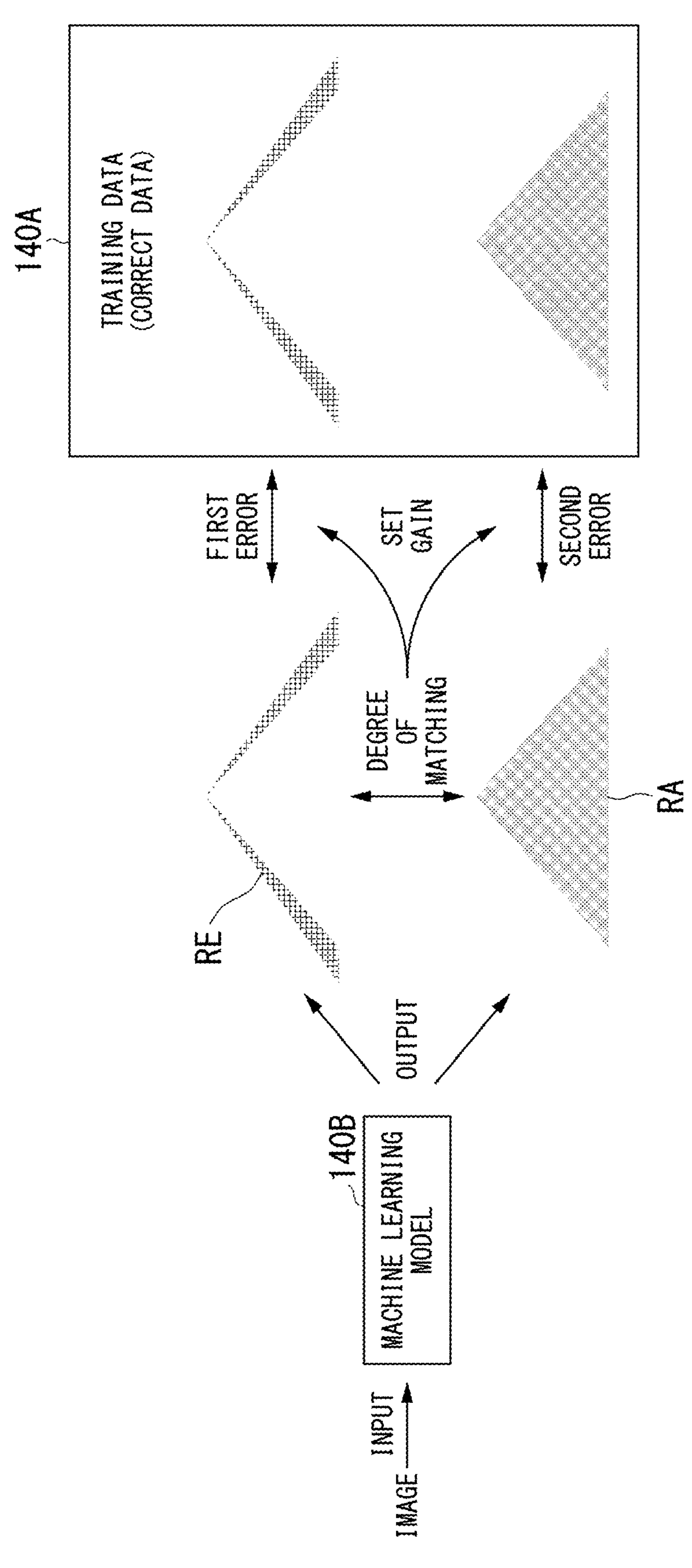
FIG. 2 is a diagram for explaining an overview of training of a machine learning model based on training data.

FIG. 2 is a diagram for explaining an overview of training of the machine learning model 140B based on the training data 140A. As shown in FIG. 2, the machine learning model 140B is a machine learning model that receives an image as an input and outputs a first pixel region RE representing road edges and a second pixel region RA representing a road area in the image. The machine learning model 140B is, for example, a convolutional neural network (CNN), which first expands the convolutional dimensionality (the number of channels) for an input image to extract features of the image and then reduces the dimensionality to extract a first pixel region RE representing road edges and a second pixel region RA representing a road area from the image.

The determining unit 110 compares the first pixel region RE and the second pixel region RA output from the machine learning model 140B and determines the degree of matching between the pixel regions. That is, since a road area is generally sandwiched between road edges without gaps and without overlap, the determining unit 110 determines the degree of matching based on whether the second pixel region RA representing a road area is sandwiched by the first pixel region RE representing road edges without gaps and without overlap.

Figure 3:
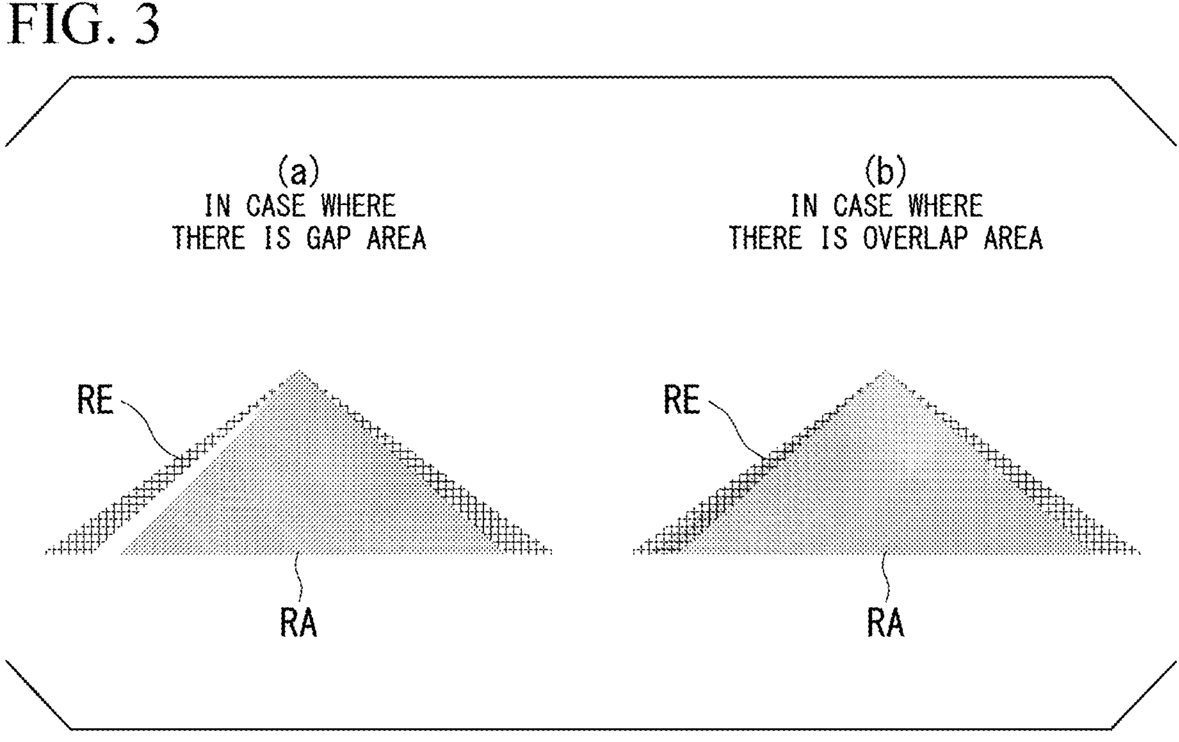
FIG. 3 is a diagram for explaining the determination of the degree of matching by a determining unit.

FIG. 3 is a diagram for explaining the determination of the degree of matching by the determining unit 110. The determining unit 110 checks the first pixel region RE and the second pixel region RA in the image, and when there is a gap area between the first pixel region RE and the second pixel region RA as shown in FIG. 3(*a*), determines that the degree of matching between the first and second pixel regions is lower. When there is an overlap area between the first pixel region RE and the second pixel region RA as shown in FIG. 3(*b*), the determining unit 110 also determines that the degree of matching between the pixel regions is lower.

The setting unit 120 sets a gain for errors between the first pixel region RE and the second pixel region RA and the training data 140A (correct data) based on the degree of matching determined by the determining unit 110. Here, the training data 140A is that in which a pixel region representing road edges and a pixel region representing a road area are specified in an image in advance as shown in FIG. 2. The training data 140A is generated, for example, by an administrator or worker of the learning device 100 specifying road edges and a road area along pixels of an image in advance on his or her own terminal and is stored in the storage unit 140. Alternatively, the learning device 100 may download the training data 140A stored in an external server to the storage unit 140 via a network at the time when the setting unit 120 performs learning.

The setting unit 120 sets a gain corresponding to the degree of matching for a first error between the first pixel region RE and the correct data of the road edges and a second error between the second pixel region RA and the correct data of the road area (for example, multiplies the first error and the second error by the gain). More specifically, the setting unit 120 sets a gain of a larger value for the first error and the second error as the determined degree of matching becomes lower.

After the setting unit 120 sets a gain for the first error and the second error, the learning unit 130 trains the machine learning model 140B so as to reduce the value of a loss function which is based on the first error and the second error for which the gain has been set (for example, an absolute sum of the first error and the second error). Training in this case may use any learning method such as, for example, error back propagation. The learning unit 130 acquires the machine learning model 140B whose training has been completed as a trained model.

The acquired trained model may be used by a driving support device or a vehicle control device installed in a vehicle. For example, the driving support device may input an image in front of the vehicle captured by a camera to the trained model and display road edges or a road area output by the trained model on an HMI. Alternatively, for example, the vehicle control device may input an image in front of the vehicle captured by a camera to the trained model and control the vehicle such that it travels between the road edges or within the road area output by the trained model.

In the prior art, a machine learning model is generally trained so as to reduce the value of a loss function which is based on an error between an output of the machine learning model and correct data representing road edges or a road area as described above. On the other hand, in the present embodiment, the machine learning model is trained for errors between a plurality of outputs of the machine learning model and correct data so as to reduce the value of a loss function which is based on the errors in consideration of a gain while considering the degree of matching between the plurality of outputs of the machine learning model as the gain. That is, the present embodiment can ensure the accuracy of a road area detected from an image by verifying the road area from a plurality of viewpoints.

Flow of Process

Figure 4:
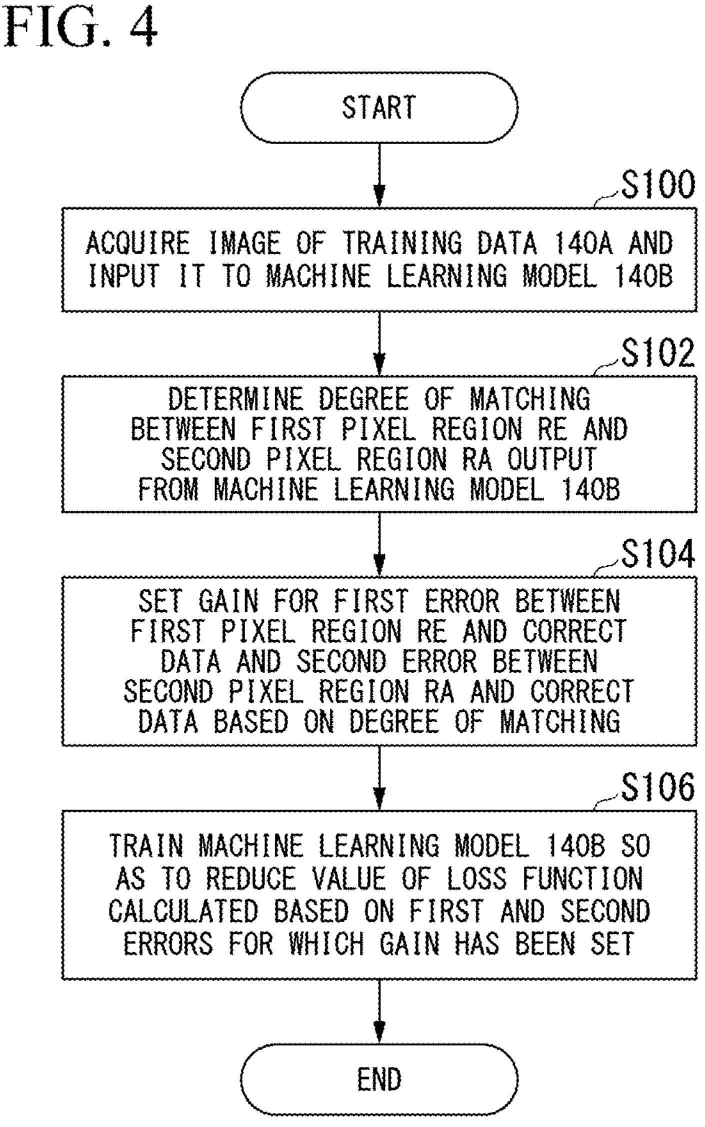
FIG. 4 is a flowchart showing an example of a flow of a process performed by the learning device according to the present embodiment.

Next, a flow of a process performed by the learning device 100 according to the present embodiment will be described with reference to FIG. 4. FIG. 4 is a flowchart showing an example of a flow of a process performed by the learning device 100 according to the present embodiment.

First, the learning unit 130 acquires an image from the training data 140A stored in the storage unit 140 and inputs the acquired image to the machine learning model 140B (step S100). Next, the determining unit 110 determines the degree of matching between a first pixel region RE and a second pixel region RA output from the machine learning model 140B (step S102).

Next, the setting unit 120 sets a gain for a first error between the first pixel region RE and the correct data and a second error between the second pixel region RA and the correct data based on the degree of matching (step S104). Next, the learning unit 130 trains the machine learning model 140B so as to reduce the value of a loss function calculated based on the first error and the second error for which the gain has been set (step S106). Then, the process according to this flowchart ends.

In the present embodiment, a first pixel region representing road edges and a second pixel region representing a road area in an image that a machine learning model outputs upon receiving the image as an input are compared to determine a degree of matching between the first pixel region and the second pixel region, a gain is set for a first error between the output first pixel region and correct data representing the road edges and a second error between the output second pixel region and correct data representing the road area based on the degree of matching, and the machine learning model is trained so as to reduce a value of a loss function calculated based on the first error and the second error for which the gain has been set as described above. That is, it is possible to ensure the accuracy of a road area detected from an image by verifying the road area from a plurality of viewpoints.

The embodiment described above can be expressed as follows.

A learning device including:

a storage medium configured to store computer-readable instructions; and a processor connected to the storage medium, the processor executing the computer-readable instructions to:

compare a first pixel region representing road edges and a second pixel region representing a road area in an image that a machine learning model outputs upon receiving the image as an input to determine a degree of matching between the first pixel region and the second pixel region;

set a gain for a first error between the output first pixel region and correct data representing the road edges and a second error between the output second pixel region and correct data representing the road area based on the degree of matching; and train the machine learning model so as to reduce a value of a loss function calculated based on the first error and the second error for which the gain has been set.

Although the mode for carrying out the present invention has been described above by way of embodiments, the present invention is not limited to these embodiments at all and various modifications and substitutions may be made without departing from the spirit of the present invention.

What is claimed is:

1. A learning device configured to train a machine learning model that receives an image as an input and outputs a first pixel region representing road edges and a second pixel region representing a road area in the image, the learning device comprising:

a storage medium configured to store computer-readable instructions; and a processor connected to the storage medium, the processor executing the computer-readable instructions to:

compare the first pixel region and the second pixel region to determine a degree of matching between the first pixel region and the second pixel region;

set a gain for a first error between the output first pixel region and correct data representing the road edges and a second error between the output second pixel region and correct data representing the road area based on the degree of matching; and train the machine learning model so as to reduce a value of a loss function calculated based on the first error and the second error for which the gain has been set, wherein the processor is configured to determine that the degree of matching has become greater as a gap and overlap, with which the second pixel region is sandwiched by the first pixel region, has been reduced.

2. The learning device according to claim 1, wherein the processor is configured to increase a value of the gain to be set as the determined degree of matching decreases.

3. A learning device configured to train a machine learning model that receives an image as an input and outputs a first pixel region representing road edges and a second pixel region representing a road area in the image, the learning device comprising:

a storage medium configured to store computer-readable instructions; and a processor connected to the storage medium, the processor executing the computer-readable instructions to:

compare the first pixel region and the second pixel region to determine a degree of matching between the first pixel region and the second pixel region;

set a gain for a first error between the first pixel region and first correct data representing the road edges and a second error between the second pixel region and second correct data representing the road area based on the degree of matching; and train the machine learning model so as to reduce a value of a loss function calculated based on the first error and the second error for which the gain has been set, wherein the processor is configured to increase a value of the gain to be set as the determined degree of matching decreases.

4. A learning method for training a machine learning model that receives an image as an input and outputs a first pixel region representing road edges and a second pixel region representing a road area in the image, the learning method comprising:

by a computer, comparing the first pixel region and the second pixel region to determine a degree of matching between the first pixel region and the second pixel region;

setting a gain for a first error between the output first pixel region and correct data representing the road edges and a second error between the output second pixel region and correct data representing the road area based on the degree of matching; and training the machine learning model so as to reduce a value of a loss function calculated based on the first error and the second error for which the gain has been set, wherein the computer determines that the degree of matching has become greater as a gap and overlap, with which the second pixel region is sandwiched by the first pixel region, has been reduced.

5. A computer-readable non-transitory storage medium storing a program for training a machine learning model that receives an image as an input and outputs a first pixel region representing road edges and a second pixel region representing a road area in the image, the program causing a computer to:

compare the first pixel region and the second pixel region to determine a degree of matching between the first pixel region and the second pixel region;

set a gain for a first error between the output first pixel region and correct data representing the road edges and a second error between the output second pixel region and correct data representing the road area based on the degree of matching;

train the machine learning model so as to reduce a value of a loss function calculated based on the first error and the second error for which the gain has been set; and determine that the degree of matching as become greater as a gap and overlap, with which the second pixel region is sandwiched by the first pixel region, has been reduced.

* * * * *